United States Patent
Welch et al.

(10) Patent No.: US 6,398,163 B1
(45) Date of Patent: Jun. 4, 2002

(54) ENHANCED LUGGAGE BIN SYSTEM

(76) Inventors: Jerry Welch, 13629 Rector Rd., Bow, WA (US) 98232; Rob H. Roth, 7664 Logsdon La., Concrete, WA (US) 98237

( * ) Notice: Subject to any disclaimer, the term of this patent is extended or adjusted under 35 U.S.C. 154(b) by 0 days.

(21) Appl. No.: 09/583,306

(22) Filed: May 30, 2000

Related U.S. Application Data

(60) Provisional application No. 60/138,488, filed on Jun. 10, 1999.

(51) Int. Cl.[7] ............................................... B64D 11/00
(52) U.S. Cl. .................................. 244/118.1; 244/118.5
(58) Field of Search .......................... 244/118.1, 118.5, 244/119, 117 R, 137.5, 137.2; 312/266, 269, 246, 247, 248, 272, 319.1; 105/321, 375; 5/9 R, 10 R

(56) References Cited

U.S. PATENT DOCUMENTS

| | | | |
|---|---|---|---|
| 5,108,048 A | * | 4/1992 | Chang ...................... 244/118.1 |
| 5,129,597 A | * | 7/1992 | Manthey et al. .......... 244/118.5 |
| 5,395,074 A | * | 3/1995 | Hart et al. ................ 244/118.1 |
| 5,687,929 A | * | 11/1997 | Hart et al. ................ 244/118.1 |

* cited by examiner

*Primary Examiner*—Galen L. Barefoot
(74) *Attorney, Agent, or Firm*—David L. Garrison; Garrison & Assoc. PS

(57) ABSTRACT

A method and apparatus for enhancing the size and appearance of luggage bins on aircraft in which a shelf extension is attached to the front lip of the shelf and supported by brackets mounted to the side bulkheads of the bin. A curved profile door having rearwardly disposed webs at each end is pivotally mounted at the top of the bin and is configured to close against the front edges of the bin side bulkheads and the upper front surface of the bin shelf extension. Trim is provided to close the gap between adjacent shelf extensions and to cover the portion of shelf brackets extending beyond the front edges of the side bulkheads.

9 Claims, 3 Drawing Sheets

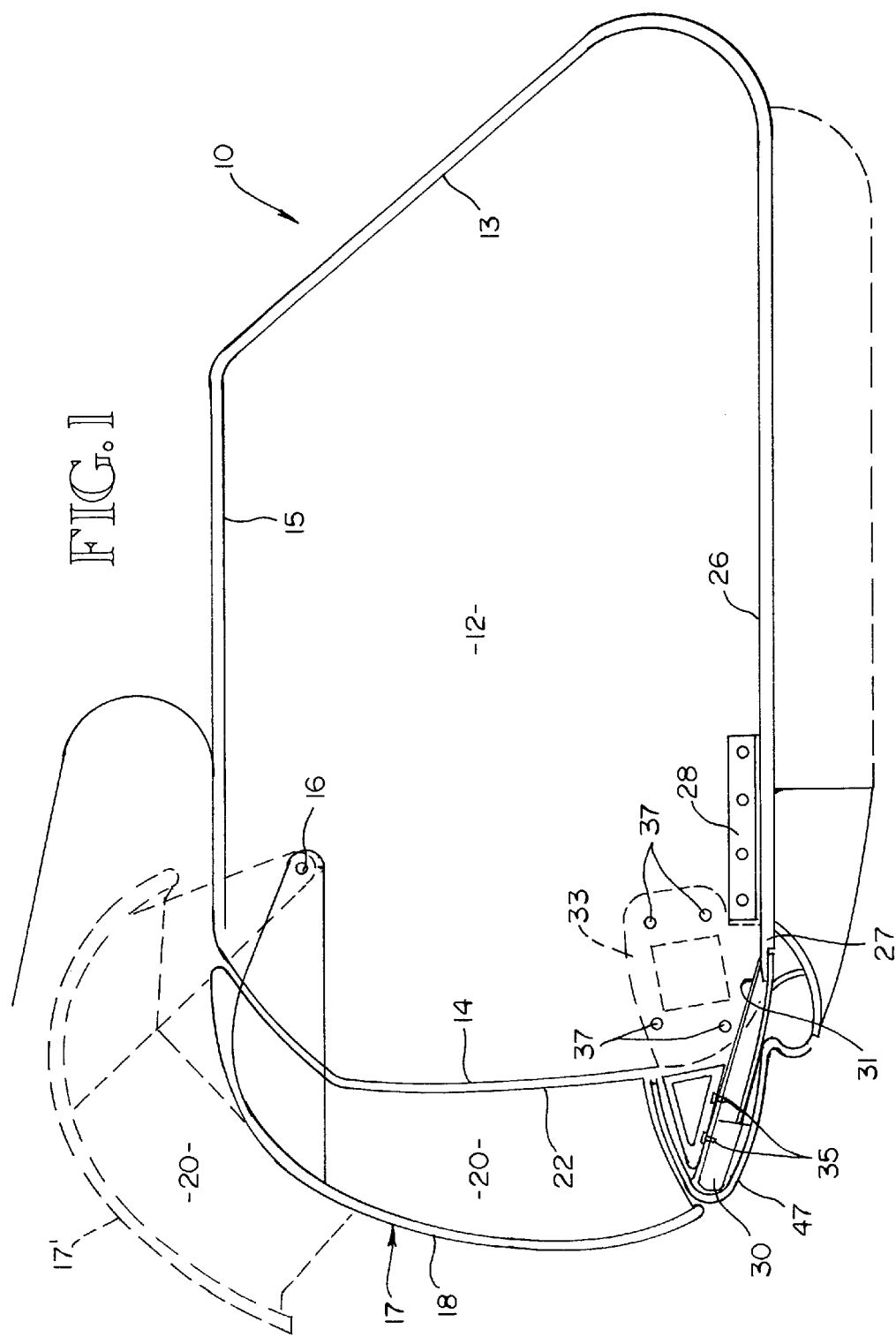

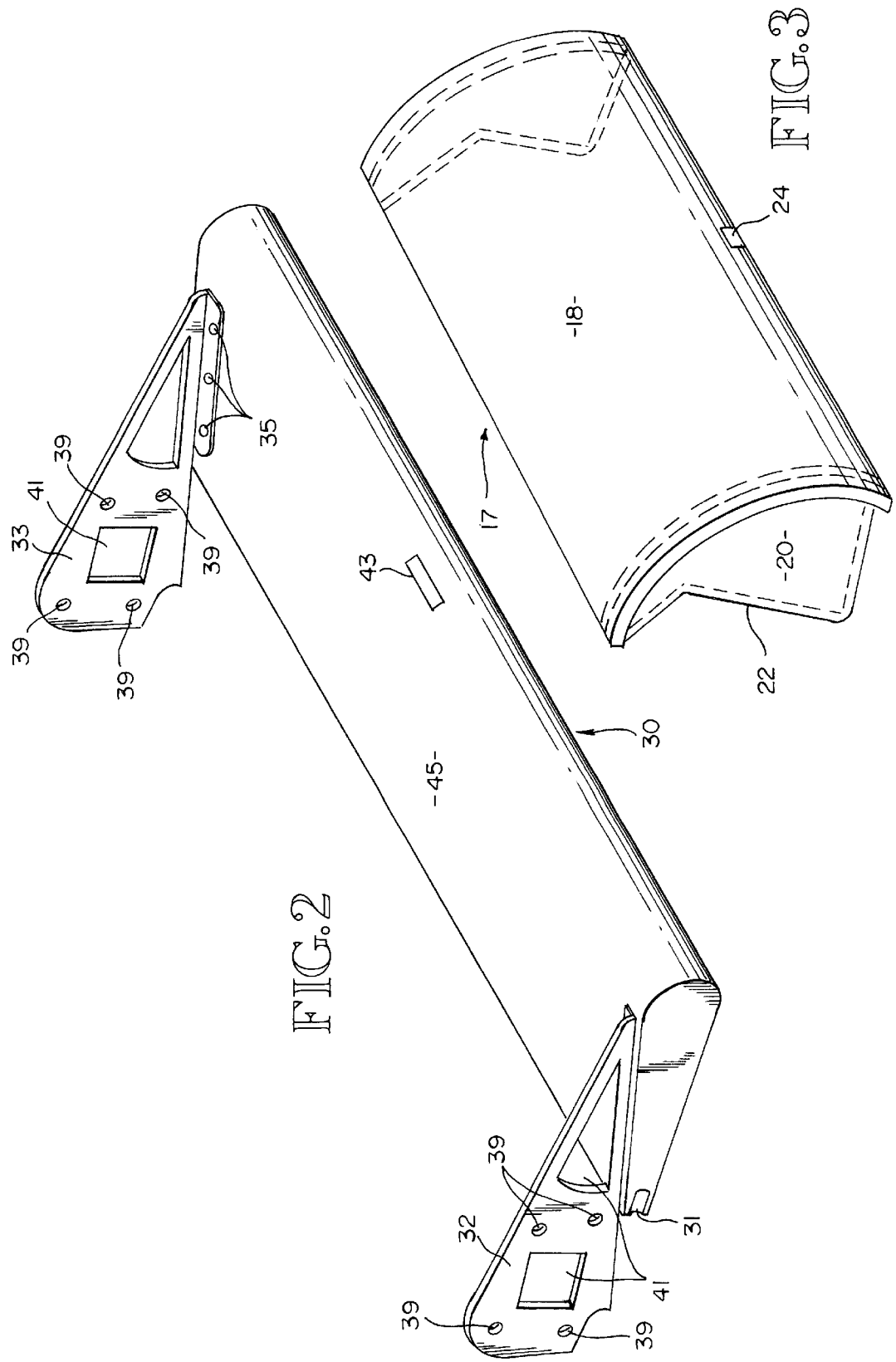

ENHANCED LUGGAGE BIN SYSTEM

This application claims the benefit of United States Provisional Application Serial No. 60/138,488, entitled Enhanced Luggage Bin System, and filed Jun. 10, 1999.

FIELD OF THE INVENTION

The invention provides enhanced luggage bins of modified configuration for use in aircraft and other passenger transportation systems. In particular, the invention provides a retrofit bin shelf extension adapted for mounting on the shelf of existing bins to increase the volumetric capacity of an existing stowage bin to accept roll on luggage and other large baggage, while maintaining safety and providing an improved aesthetic for the passenger cabin.

BACKGROUND OF THE INVENTION

Airline passengers are increasingly expecting and demanding passenger compartments to be equipped with adequate storage space nearby the passenger's seats to accommodate larger carry-on luggage, including those known as roll-on luggage or wheeled suitcases. These increasing numbers of airline customers, especially the important business traveler segment, have vociferously opposed the efforts by airlines to restrict the size of carry-on or roll-on luggage to pieces that fit existing luggage bins or beneath the seats in front of the passengers. The limited space beneath the seat in front of the passengers cannot usually accommodate the roll-on luggage. The passenger opposition to size limitations and the delays and ill-will created by airline efforts to require that oversize pieces be checked create a need for airlines to provide enlarged storage bins on their aircraft.

Substantial numbers of existing aircraft are not equipped with storage bins large enough to accommodate roll-on luggage, which many passengers prefer for their travels. To address their customer's requests, airlines need to modify or replace their current storage bins with facilities adequate for the needs of the passengers. Extending the existing shelves of storage bins currently installed on aircraft provides a cost efficient and less time consuming alternative to replacement of the entire storage bins.

SUMMARY OF THE INVENTION

The invention taught herein provides enhanced overhead luggage storage bins of expanded capacity especially for use in cabins of aircraft and other passenger transport systems. According to the invention, existing luggage bins are increased in capacity by the addition of a bin shelf extension mounted at the opening to the bin and a redesigned door. The existing bin includes a substantially rectangular shelf having attached thereto a pair of vertical side bulkheads, a top panel extending between upper ends of the bulkheads, and a rear panel which is vertical or contoured to fit the configuration of the aircraft interior in which it is mounted. The bin shelf extension, or bullnose, is supported by end brackets which are attached to the side bulkheads, and abuts the front lip of the shelf of the existing bin so that the upper surface of the bin shelf extension is substantially faired into the surface of the shelf. If desired, a luggage retainer step may be provided to engage and hold the luggage in place, or the bullnose surface may be angled upwardly to aid in retaining the luggage in the proper location. In one embodiment of this invention, a door having a curved outer profile is provided which carries a pair of interior depending webs adapted to mate with the front margins of the side bulkheads of the existing bin, thereby closing the bin securely whenever the door is closed, yet enhancing the volume and inside dimensions of the enhanced bin. Conventional door hardware of hinges, preloaded springs and closures are employed to make entry and closure of the door convenient and secure. In another embodiment, the door has a curved outer profile and mates with a trim piece used to close the side areas of the bin. The trim piece is mounted on the top of the bin with a bracket and cooperates with the trim piece on the adjacent bin to capture the side walls of the bin therebetween, without the use of fasteners attaching the trim piece to the side walls. Alternatively, the trim piece may be of a generally V-shaped configuration to span the gap between adjacent bins and bear against side bulkheads thereof.

Provision is made in the door and the shelf extension for turbulence hand holds so that the passengers or crew on the aircraft will have a convenient and safe location to grasp in the event of unexpected mid-air turbulence.

The bin shelf extension and modified door structure are readily installed to expand the capacity of bins of aircraft having various seat and aisle configurations. Accordingly, the bin enhancements of this invention may be used to expand the capacity of side bins of wide body, multiple aisle aircraft as well as those aircraft that have a central aisle with two or three seats on either side. In some instances, the centerline bins found in some wide-bodied aircraft may be enhanced according to the teachings of this invention.

It is contemplated that the bin shelf extensions of this invention may be installed utilizing most of the frontal contour of the existing bin bulkheads without structural modification to or extensions added to the side bulkheads or top of the existing bin. A newly designed door cooperates with the existing bin sidewalls, a shelf extension and trim elements to provide the advantageous and aesthetically pleasing configuration of the retrofit luggage bins. The trim elements are provided to close the gap between adjacent shelf extensions and to cover the portion of shelf brackets extending beyond the front edges of the side bulkheads.

By expanding the storage space of existing bins, without modifying or extending the sidewalls of the existing bins, the invention obviates the need for complete replacement of the existing bins with new larger bins. The curved outer surface of the replacement door provides a new and aesthetically pleasing appearance to the aircraft interior. A significant savings in aircraft downtime and replacement cost is obtained by use of this invention. A typical installation on a standard cross section bin of 60 inches permits the modified bin to accommodate four, 22 inch roller bags, which could not be accommodated in the unmodified bin.

BRIEF DESCRIPTION OF THE DRAWINGS

The foregoing aspects and many of the attendant advantages of this invention will become more readily apparent by reference to the following drawings which are more fully explained by reference to the description thereof contained in the description of the preferred embodiment of this invention:

FIG. 1 is a side view of a luggage bin modified by installation of the components of this invention;

FIG. 2 is a perspective view of one embodiment of the bin shelf extension of this invention;

FIG. 3 is a perspective view of one embodiment of the door used in this invention;

DETAILED DESCRIPTION OF THE PREFERRED EMBODIMENT

Figure 4:
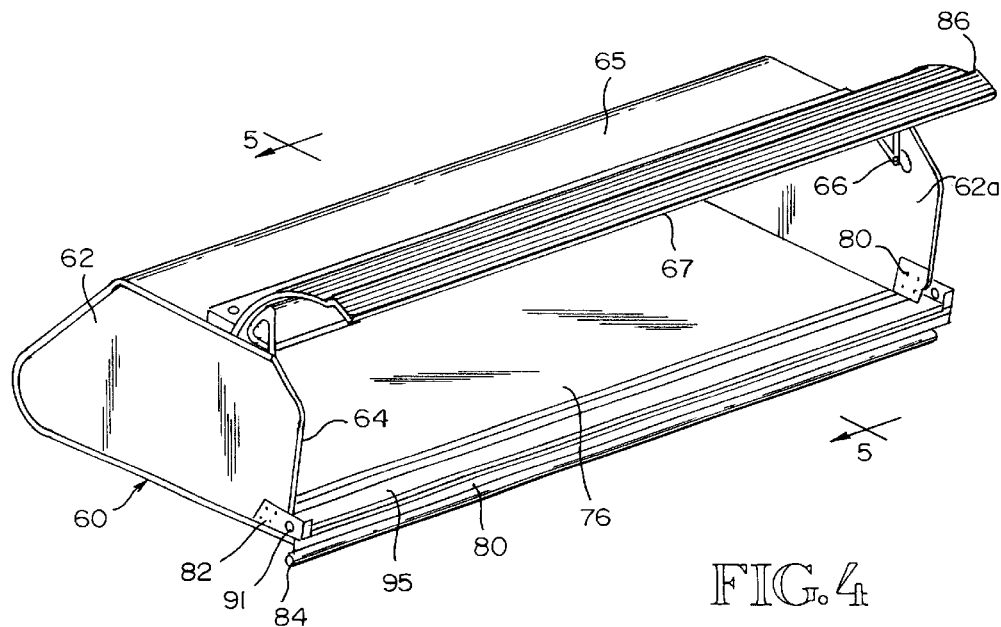
FIG. 4 is a perspective view of another embodiment of this invention.

Luggage bin enhancement using the bin shelf extension of the invention expands the storage space of aircraft luggage bins, while remarkably altering the appearance of the interior of the passenger cabin. Preferably, the original luggage bin carcass is reused in its entirety with a new door, shelf extension and trim installed as a retrofit. The enhancement installation is quite simple and can be accomplished with minimal downtime of the aircraft, such as during routine maintenance.

Referring specifically to the drawings, wherein like numerals indicate like parts, there is seen in FIG. 1, a side view of the luggage bin 10 having the apparatus of this invention installed thereupon. The bin comprises a rear bulkhead 13 positioned and contoured to optimally fit near the interior surface of the passenger compartment of an aircraft. Bin 10 is structurally attached to and supported by the aircraft body in a known manner. The bin shelf 26 is adapted to receive and support a load, such as luggage and other passenger belongings. Side bulkheads 12 are attached to the shelf 26 at side margins thereof and extend upwardly to top panel 15. A reinforced flange 28 may be used to more securely attach the side bulkheads to the shelf near the front thereof. Mounting hardware (not shown) for mounting door hinge 16 is securely fastened to the side bulkheads 12.

A shelf extension or bullnose 30 is shown positioned at the lip 27 of shelf 26 and effectively extends the overall depth of the bin to accommodate larger luggage, such as the popular "roll-on" type luggage widely used by the traveling public, particularly airline passengers. Bullnose 30 has an attachment means 31 in the form of a slot at its rear edge to receive the forward lip of shelf 26. Shelf extension brackets 33 are attached to each end of shelf extension 30 with fasteners 35. Brackets 33 may be positioned against either the inside surface or outside surface of bin side bulkheads 12 and fastened in place with fasteners 37. Brackets 33 are preferable constructed of metal sheet material, appropriately formed to function as shown and have much of the interior web material removed to decrease the weight thereof. Trim element 47 is used to cover the gap between adjacent shelf extensions 30 and preferable is formed to snap into position without fasteners. Depending side trim elements 49 are adapted to cover the heads of fasteners 35 and provide an aesthetically pleasing appearance to the finished bin.

Door 17 has a smoothly curved outer surface 18 and is reinforced on its inner side by door closure webs 20. Webs 20 are of similar or preferably identical shape and are positioned at each end of door 17. The rear margin 21 of web 20 is contoured to mate with and engage the front surface 14 of side bulkhead 12 whenever door 17 is closed.

Figure 5:
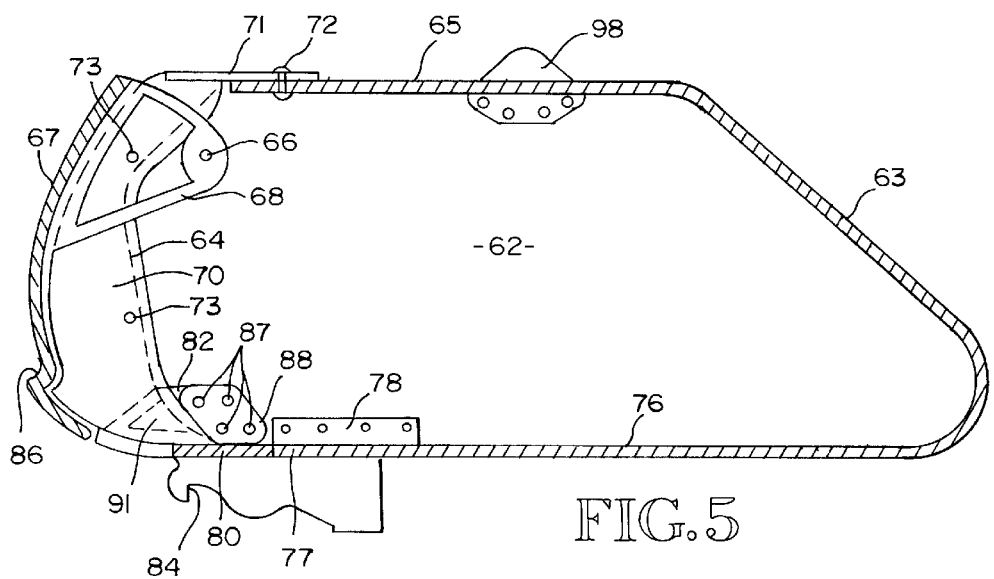
FIG. 5 is a cross sectional view taken along lines 5—5 of FIG. 4.

A second embodiment of the invention is shown in FIGS. 4 and 5. In this embodiment, the door 67 is shown in a configuration in which the exterior surface is aesthetically curved and incorporates a provision for turbulence handhold 86. The inner and outer surfaces of door 67 are curved as shown without the presence of a door closure web as described in the previous embodiment. A trim piece 70 (not shown in FIG. 4) is used to build the zone between the front surface 64 of side bulkhead 62. As is best seen in FIG. 5, trim piece 70 extends rearwardly of front surface 64 and thus overlaps the side bulkhead. Trim piece 70 is attached with trim piece bracket 71 using fastener 72 or other means of fastening the bracket well known in the art. Compression fitting 73 are utilized with the trim piece on an adjacent pin so that trim piece and its adjacent counterpart capture the side bulkhead 62 therebetween. Alternatively, a single U-shaped trim piece may be utilized extending over and closing the gap between adjacent bins, with compression fittings drawing the side surfaces of the trim pieces together, bearing on the interior surface of adjacent side bulkheads.

Door 67 is rotatably mounted on door pivot 66 for rotation upwardly and out of its closed position permitting access to the interior of bin 60.

Bin 60 is mounted to the structure of the aircraft in known fashion, such as utilizing bin support 98 or comparable mounting fixtures.

Bin extension 80 abuts shelf lift 77 of shelf 76 and is fastened by a support bracket 82. Support bracket 82 is fastened to bulkhead sidewall 62 using fasteners 87. Preferably, a bracket aperture 91 is present in the shelf extension bracket 82 to minimize weight.

Retrofitting an existing luggage bin may be accomplished by use of the invention disclosed herein by the following steps:

1. The existing door and bullnose of the luggage bin to which this invention is to be applied are removed.
2. Shelf extension brackets 33 are attached to the interior or exterior surface of bin side bulkheads 12 with suitable fasteners 37.
3. Shelf extension 30 is positioned with its shelf lip receiving slot 31 engaging the front lip of shelf 26 and fasteners 35 placed to securely fasten shelf extension 30 in place.
4. Door 17 is installed at hinge point 16 with appropriate hardware to permit easy opening of the door and to maintain the door in the open position while materials are being inserted or removed from the enhanced bin.
5. Appropriate trim pieces are added to close the gap between adjacent bins.

In operation, the enhanced bin may be readily opened by operation of latch mechanism 24 to disengage the door from door latch 43. The door is then rotated upwardly, preferably with spring assist, into the open position shown in dotted lines in FIG. 1. When the luggage is in place and the bin ready to be closed, the reverse steps are conducted, with the door webs 20 interfitting with front surface 14 of the side bulkheads 12, and with the upper surface of trim piece 47 thereby securely closing the end areas of the bin. Latch 24 then secures the door shut.

In compliance with the statute, the invention has been described in language more or less specific as to structural features. It is to be understood, however that the invention is not limited to the specific features shown, since the means and construction herein disclosed comprise a preferred form of putting the invention into effect. The invention is, therefore, claimed in any of its forms or modifications within the legitimate and valid scope of the appended claims, appropriately interpreted in accordance with the doctrine of equivalents.

We claim:

1. An enhanced luggage bin for aircraft to receive larger luggage comprising:
   (a) an existing shelf-type luggage bin having a bin shelf, first and second bin side bulkheads extending upwardly from said bin shelf, a bin top extending between upper ends of said bin side bulkheads, and a rear bulkhead, said shelf and said side bulkheads defining an opening for insertion of luggage therein;

(b) shelf extension mounting brackets attached to said side bulkheads and extending outwardly therefrom to receive a shelf extension;

(c) a shelf extension mounted upon said shelf and attached to said brackets to extend the effective load carrying area of said shelf;

(d) a door hinged at its top for closing said opening, said door having a curved outer surface and rearwardly extending webs, said webs configured to engage front surfaces of said side bulkheads when said door is closed;

(e) trim pieces covering ends of said shelf extension, said trim pieces having depending wings to cover exposed areas of said mounting brackets.

2. The apparatus of claim 1 wherein said door webs are inset from the ends of said door and are substantially perpendicular to a longitudinal axis of said door.

3. The apparatus of claim 1 wherein said door webs engage said trim pieces when said door is closed.

4. The method of enhancing the size and appearance of a luggage bin for an aircraft comprising the steps of:

i. Removing the existing door and bullnose of the luggage bin to which this invention is to be applied;

ii. Attaching shelf extension brackets to the interior or exterior surface of bin side bulkheads with suitable fasteners;

iii. Positioning a shelf extension with its shelf lip receiving slot engaging the front lip of shelf and placing fasteners to securely fasten said shelf extension in place; and iv. Installing a door at a hinge point at its upper end with appropriate hardware to permit easy opening of the door and to maintain the door in the open position while materials are being inserted or removed from the enhanced bin.

5. The method of claim 4 further including the step of installing trim pieces to cover a gap between adjacent bins.

6. An enhanced luggage bin for aircraft to receive larger luggage comprising:

(a) an existing shelf-type luggage bin having a bin shelf, first and second bin side bulkheads extending upwardly from said bin shelf, a bin top extending between upper ends of said bin side bulkheads, and a rear bulkhead, said shelf and said side bulkheads defining an opening for insertion of luggage therein;

(b) shelf extension mounting brackets attached to said side bulkheads and extending outwardly therefrom to receive a shelf extension;

(c) a shelf extension abutting said shelf and attached to said brackets to extend the effective load carrying area of said shelf;

(d) trim pieces mounted to said bin top and extending downwardly therefrom, said trim pieces extending forwardly from said side bulkheads; and (e) a door hinged at its top for closing said opening, said door having a curved outer surface, said door configured to engage front surfaces of said trim pieces when said door is closed.

7. The apparatus of claim 6 wherein said trim pieces cover a gap between adjacent bins.

8. The apparatus of claim 6 wherein said door further comprises a turbulence hand hold.

9. The apparatus of claim 6 wherein said shelf extension further includes a turbulence hand hold.

* * * * *